United States Patent
Shimakage et al.

(10) Patent No.: US 8,618,205 B2
(45) Date of Patent: Dec. 31, 2013

(54) THERMAL STORAGE MEDIUM COMPOSITION AND THERMAL STORAGE MEDIUM

(75) Inventors: Masashi Shimakage, Tokyo (JP); Takuya Sano, Tokyo (JP); Toshiyuki Hayakawa, Tokyo (JP); Susumu Komiyama, Tokyo (JP); Junji Koujina, Tokyo (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 13/518,448

(22) PCT Filed: Dec. 24, 2010

(86) PCT No.: PCT/JP2010/073380
§ 371 (c)(1),
(2), (4) Date: Jun. 22, 2012

(87) PCT Pub. No.: WO2011/078340
PCT Pub. Date: Jun. 30, 2011

(65) Prior Publication Data
US 2012/0261607 A1    Oct. 18, 2012

(30) Foreign Application Priority Data
Dec. 25, 2009 (JP) .................. 2009-295960

(51) Int. Cl.
*C08L 91/08* (2006.01)
*C08K 5/01* (2006.01)

(52) U.S. Cl.
USPC .......................................... 524/487; 524/490

(58) Field of Classification Search
USPC ....................................................... 524/487
See application file for complete search history.

(56) References Cited

U.S. PATENT DOCUMENTS

| | | |
|---|---|---|
| 3,431,323 A | 3/1969 | Jones |
| 4,501,857 A | 2/1985 | Kishimoto et al. |
| 4,980,421 A | 12/1990 | Teramoto et al. |
| 5,039,755 A | 8/1991 | Chamberlain et al. |
| 5,270,274 A | 12/1993 | Hashiguchi et al. |
| 5,718,835 A | 2/1998 | Momose et al. |
| 6,291,596 B1 | 9/2001 | Sasanuma et al. |

FOREIGN PATENT DOCUMENTS

| | | |
|---|---|---|
| GB | 1 293 074 | 10/1972 |
| JP | 43-19960 | 8/1968 |
| JP | 47-40473 | 10/1972 |
| JP | 59-133203 A | 7/1984 |
| JP | 62-218403 A | 9/1987 |
| JP | 63-5401 A | 1/1988 |
| JP | 1-275605 A | 11/1989 |
| JP | 3-66788 A | 3/1991 |
| JP | 5-222115 A | 8/1993 |
| JP | 05214329 A * | 8/1993 |
| JP | 5-271325 A | 10/1993 |
| JP | 5-271326 A | 10/1993 |
| JP | 6-17041 A | 1/1994 |
| JP | 7-90017 A | 4/1995 |
| JP | 9-263678 A | 10/1997 |
| JP | 09263678 A * | 10/1997 |
| JP | 11-292924 A | 10/1999 |
| JP | 2000-37632 A | 2/2000 |
| JP | 2003-261716 A | 9/2003 |
| JP | 2007-31685 A | 2/2007 |
| JP | 2008101118 A * | 5/2008 |
| JP | 2009173834 A * | 8/2009 |

OTHER PUBLICATIONS

JP 09-263678 A (1997), machine translation, JPO Advanced Industrial Property Network (AIPN).*
JP 05-214329 A (1993), machine translation, JPO Advanced Industrial Property Network (AIPN).*
JP 09-263678 (1997), machine translation, JPO Advanced Industrial Property Network (AIPN).*
JP 2008-101118 A (2008), machine translation, JPO Advanced Industrial Property Network (AIPN).*
JP 2009-173834 A (2009), machine translation, JPO Advanced Industrial Property Network (AIPN).*
International Search Report issued Mar. 8, 2011, in PCT/JP2010/073380.

* cited by examiner

*Primary Examiner* — David W Wu
*Assistant Examiner* — Josephine Chang
(74) *Attorney, Agent, or Firm* — Oblon, Spivak, McClelland, Maier & Neustadt, L.L.P.

(57) ABSTRACT

Provided is a thermal storage medium composition which contains 100 parts by mass of a hydrogenated diene copolymer and 50 to 4000 parts by mass of a linear paraffin compound having 12 to 50 carbon atoms, where the hydrogenated diene copolymer is a conjugated diene copolymer that is obtained by hydrogenating a block copolymer which includes a polymer block (A) that contains structural units (a-1) derived from a first conjugated diene compound and has a vinyl bond content of not more than 20 mol %, and a polymer block (B) that contains structural units (b-1) derived from a second conjugated diene compound and has a vinyl bond content of 30 to 95 mol %, the hydrogenation ratio with respect to the double bonds derived from the conjugated diene compounds being not less than 90%.

9 Claims, No Drawings

THERMAL STORAGE MEDIUM COMPOSITION AND THERMAL STORAGE MEDIUM

TECHNICAL FIELD

The present invention relates to a thermal storage medium composition and a thermal storage medium. In more detail, the invention relates to a thermal storage medium composition capable of forming a thermal storage medium which is free from phase separation or liquid phase bleeding and is excellent in terms of shape retention properties even at or above the maximum crystal transition temperature of a paraffin compound contained in the composition and further exhibits excellent fluidity when being shaped, as well as to a thermal storage medium obtained with the composition.

BACKGROUND ART

A thermal storage medium is a material which contains a substance with a high heat capacity, and can store heat in the substance and release it as needed. Thermal storage media are used in various fields including air-conditioning units in facilities such as hotels, airports and underground cities, automobile canisters, electronic parts such as IC chips, underwear fibers, thermally insulated containers for transportation of organs, curved mirrors and bridge concrete materials.

Water is commonly used in thermal storage media. In most cases, however, thermal storage with water depends solely on the use of sensible heat caused by a temperature change. Thus, attention has been drawn to thermal storage media that use not only sensible heat but latent heat caused by a phase change.

Paraffins are compounds that can use a latent heat generated by a phase change. However, paraffins are dangerous when used in the liquid state. In order to ensure that a paraffin does not leak when it has become fluidized, it is necessary that the paraffin be contained in a closed container or a bag. In such cases, the use of containers or the like having sufficient strength is not viable because costs are increased. On the other hand, a simplified container or the like is readily breakable to cause the risk that a paraffin will leak or come out during a long term of use.

Thus, approaches other than the use of containers have been increasingly adopted such as impregnating a porous substance with a paraffin, microencapsulating a paraffin, and a combination of these methods. However, even such methods have a problem in that the leakage of a paraffin from a porous substance or a microcapsule cannot be completely prevented. Further, these methods entail complicated production steps and a cost increase, as well as a problem that the content of a thermal storage material per unit volume is reduced. In particular, microencapsulating a paraffin has a problem in that the thermal storage performance per unit volume is decreased when a paraffin fails to completely fill the space in the microcapsule.

Another conventional method is to knead a paraffin into a crystalline polyolefin such as crystalline polyethylene. However, crystalline polyolefins are hard and are difficult to handle. Further, at high temperatures, a paraffin is phase-separated and bleeds out from a crystalline polyolefin. To prevent this problem, a solid container needs to be used. Thus, such a method is not viable.

In order to overcome the problems described above, thermal storage media comprising a paraffin and a thermoplastic elastomer as main components have been disclosed (see, for example, Patent Literature 1). Such a thermal storage medium has a latent heat as high as 30 kcal/kg or more (126 kJ/kg or more), and preferably 35 kcal/kg or more (147 kJ/kg or more) at service temperatures, which is free from phase separation or paraffin bleeding even at or above the maximum crystal transition temperature of the paraffin contained (hereinafter, also referred to as "$T_{max}$", corresponding to the melting point in most cases), and does not exhibit brittleness even at or below $T_{max}$ (below which the paraffin becomes solid) and shows appropriate flexibility without being broken even when formed into a sheet. Examples of the thermoplastic elastomers described in Patent Literature 1 include styrene block copolymer elastomers and olefin elastomers.

CITATION LIST

Patent Literature

Patent Literature 1: JP-A-1991-66788

SUMMARY OF INVENTION

Technical Problem

The thermal storage medium disclosed in Patent Literature 1 has a problem in that the storage medium exhibits bad fluidity when being shaped. This problem is ascribed to the fact that the thermoplastic elastomer, which functions to fix the paraffin, is a styrene-ethylene/butylene-styrene copolymer and the styrene blocks are aggregated when the copolymer is molten into a liquid phase by heating. A low fluidity encountered in shaping of a thermal storage medium makes it difficult for the thermal storage medium to be shaped into a precise shape and also causes low productivity. Thus, this problem has to be remedied.

The present invention has been made in view of the problems in the art described hereinabove. It is an object of the invention to provide a thermal storage medium composition capable of forming a thermal storage medium which is free from phase separation or liquid phase bleeding and is excellent in terms of shape retention properties even at or above $T_{max}$ of a paraffin compound contained in the storage medium and further exhibits excellent fluidity when being shaped.

Solution to Problem

The present inventors carried out studies in order to achieve the above object. The present inventors have then found that the object is accomplished by using a hydrogenated diene copolymer that has the following configuration as a polymer which functions to fix a paraffin compound, thus completing the present invention.

That is, the present invention provides thermal storage medium compositions and thermal storage media described below.

[1] A thermal storage medium composition which comprises 100 parts by mass of a hydrogenated diene copolymer and 50 to 4000 parts by mass of a paraffin compound having 12 to 50 carbon atoms, the hydrogenated diene copolymer being a conjugated diene copolymer that is obtained by hydrogenating a block copolymer which includes a polymer block (A) that contains structural units (a-1) derived from a first conjugated diene compound and has a vinyl bond content of not more than 20 mol %, and a polymer block (B) that contains structural units (b-1) derived from a second conjugated diene compound and has a vinyl bond content of 30 to 95 mol %, the hydrogenation ratio with respect to the double bonds derived from the conjugated diene compounds being not less than 90%.

[2] The thermal storage medium composition described in [1], wherein the mass ratio of the polymer block (A) to the polymer block (B) ((A)/(B)) in the block copolymer is 5/95 to 50/50.

[3] The thermal storage medium composition described in [1] or [2], wherein the block copolymer further includes structural units derived from an alkenyl aromatic compound at a content of not more than 30% by mass with respect to the block copolymer.

[4] The thermal storage medium composition described in any one of [1] to [3], wherein the structural units (a-1) in the polymer block (A) include 95 to 100% by mass of 1,3-butadiene-derived structural units.

[5] The thermal storage medium composition described in any one of [1] to [4], wherein the paraffin compound shows a melting peak at 0 to 70° C. according to differential scanning calorimetry (DSC).

[6] The thermal storage medium composition described in any one of [1] to [5], further comprising a filler.

[7] A thermal storage medium which is obtained by packing the thermal storage medium composition described in any one of [1] to [6] into a packaging material.

Advantageous Effects of Invention

The thermal storage medium compositions according to the present invention can form a thermal storage medium which is free from phase separation or liquid phase bleeding and is excellent in terms of shape retention properties even at or above $T_{max}$ of a paraffin compound contained in the storage medium and further exhibits excellent fluidity when being shaped.

The thermal storage media according to the present invention are free from phase separation or liquid phase bleeding and are excellent in terms of shape retention properties even at or above $T_{max}$ of a paraffin compound contained in the storage medium and further exhibit excellent fluidity when being shaped.

DESCRIPTION OF EMBODIMENTS

Embodiments of the present invention will be described hereinbelow. However, the present invention is not limited to such embodiments described below. It should be construed that various modifications and improvements may be added to the following embodiments within the spirit of the present invention and based on common technical knowledge of a person skilled in the art, and such modifications and improvements are also within the scope of the present invention.

I. Thermal Storage Medium Compositions:

A thermal storage medium composition according to the invention comprises a hydrogenated diene copolymer and a paraffin compound.

The hydrogenated diene copolymer is a hydrogenation product of a block copolymer which includes a polymer block (A) that contains structural units (a-1) derived from a first conjugated diene compound and has a smaller content of vinyl bonds, and a polymer block (B) that contains structural units (b-1) derived from a second conjugated diene compound and has a larger content of vinyl bonds. This hydrogenated diene copolymer can give a thermal storage medium that is free from phase separation or liquid phase bleeding and is excellent in terms of shape retention properties even at or above $T_{max}$ of the paraffin compound and further exhibits excellent fluidity when being shaped.

1. Hydrogenated Diene Copolymers:

The hydrogenated diene copolymer is obtained by hydrogenating a block copolymer which includes a polymer block (A) that contains structural units (a-1) derived from a first conjugated diene compound (hereinafter, simply referred to as "structural units (a-1)") and a polymer block (B) that contains structural units (b-1) derived from a second conjugated diene compound (hereinafter, simply referred to as "structural units (b-1)"). The hydrogenation ratio with respect to the double bonds derived from the conjugated diene compounds is not less than 90%.

(Block Copolymer):

(1) Polymer Block (A):

Examples of the first conjugated diene compounds include 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene and chloroprene. Of these, 1,3-butadiene, isoprene and 1,3-pentadiene are preferable, and 1,3-butadiene and isoprene are more preferable in order to obtain a thermal storage medium composition which can be used in industry and exhibits excellent properties. The first conjugated diene compounds may be used singly, or two or more kinds may be used in combination.

The structural units (a-1) preferably include 95 to 100% by mass of 1,3-butadiene-derived structural units, and particularly preferably consist solely of 1,3-butadiene-derived structural units.

The content of the structural units (a-1) in the polymer block (A) is preferably not less than 95% by mass with respect to the polymer block (A) in order to ensure fluidity of the thermal storage medium when being shaped. More preferably, the polymer block (A) consists solely of the structural units (a-1).

The content of vinyl bonds in the polymer block (A) is not more than 20 mol %, and preferably not more than 18 mol % in order to ensure that a thermal storage medium comprising the thermal storage medium composition exhibits shape retention properties at or above $T_{max}$. The lower limit of the vinyl bond content in the polymer block (A) is not particularly limited.

As used herein, the vinyl bond content indicates the total proportion (mol %) of the conjugated diene compounds which have been incorporated in the unhydrogenated polymer block through 1,2-bonds and 3,4-bonds, relative to the total of the conjugated diene compounds which have been incorporated in the unhydrogenated polymer block through 1,2-bonds, 3,4-bonds and 1,4-bonds.

(2) Polymer Block (B):

Examples of the second conjugated diene compounds include the compounds described as the first conjugated diene compounds. Preferred compounds are also similar to those described above. The second conjugated diene compound may be identical to or different from the first conjugated diene compound.

The polymer block (B) contains the structural units (b-1) derived from the second conjugated diene compound. The polymer block may further contain structural units derived from an alkenyl aromatic compound (hereinafter, also referred to as "structural units (b-2)") in order to add flexibility to the thermal storage medium composition as well as to prevent the crystallization of the polymer block (B).

The structural units (b-1) preferably include 95 to 100% by mass of structural units derived from 1,3-butadiene and/or isoprene, and particularly preferably consist solely of structural units derived from 1,3-butadiene and/or isoprene.

The content of the structural units (b-1) in the polymer block (B) is preferably not less than 50% by mass, more preferably 70 to 100% by mass, and particularly preferably 80 to 100% by mass with respect to the polymer block (B).

When the polymer block (B) further contains the structural units (b-2), the content of the structural units (b-2) is preferably not more than 50% by mass with respect to the polymer block (B) in order to ensure fluidity of the thermal storage medium when being shaped.

In the polymer block (B), the structural unit (b-1)/structural unit (b-2) mass ratio is preferably 100/0 to 50/50, more preferably 100/0 to 70/30, and still more preferably 100/0 to 80/20.

Examples of the alkenyl aromatic compounds include styrene, t-butylstyrene, α-methylstyrene, p-methylstyrene, divinylbenzene, N,N-diethyl-p-aminostyrene and vinylpyridine, with styrene and α-methylstyrene being preferable. When the polymer block (B) is a copolymer block including the structural units (b-1) and the structural units (b-2), the distribution mode of the structural units (b-1) may be a random mode, a tapered mode (in which the number of the structural units (b-1) increases or decreases along the length of a molecular chain), a partial block mode or a combination of any of these modes.

The vinyl bond content in the polymer block (B) is 30 to 95 mol %, preferably 30 to 85 mol %, and more preferably 40 to 75 mol %. In order to make sure that bleeding of a paraffin compound is prevented during the use of a thermal storage medium comprising the thermal storage medium composition, the vinyl bond content in the polymer block (B) is preferably not less than 30 mol %.

(3) Polymer Block (C):

In addition to the polymer block (A) and the polymer block (B), the block copolymer may include a polymer block (C) that contains more than 50% by mass of structural units derived from an alkenyl aromatic compound (hereinafter, also referred to as "structural units (c-1)"), or may preferably include a polymer block (C) that consists solely of the structural units (c-1). In this case, the block configuration of the block copolymer is preferably polymer block (A)-polymer block (B)-polymer block (C).

Examples of the alkenyl aromatic compounds for the structural units (c-1) include the same alkenyl aromatic compounds as those described for the structural units (b-2). Preferred compounds are also similar to those described above.

(4) Block Configuration

In the block copolymer, the mass ratio of the polymer block (A) to the polymer block (B) ((A)/(B)) is usually 5/95 to 50/50, and preferably 10/90 to 40/60. In order to make sure that a thermal storage medium comprising the thermal storage medium composition exhibits shape retention properties at or above $T_{max}$ it is preferable that the polymer block (A) represent 5 or more and the polymer block (B) represent 95 or less in the ratio. In order to make sure that bleeding of a paraffin compound is prevented during the use of a thermal storage medium comprising the thermal storage medium composition, it is preferable that the polymer block (A) represent 50 or less and the polymer block (B) represent 50 or more in the ratio.

When the block copolymer further contains the polymer block (C), the mass ratio of the polymer blocks (A) and (B) combined to the polymer block (C) ({(A)+(B)}/(C)) is usually 80/20 to 99/1, and preferably 85/15 to 95/5. If the polymer block (C) represents more than 20 in the ratio, melt processability may be deteriorated.

In the block copolymer, the content of the structural units derived from an alkenyl aromatic compound is preferably not more than 30% by mass, and more preferably 20 to 5% by mass with respect to the block copolymer in order to ensure fluidity of the thermal storage medium when being shaped. Here, the content of the structural units derived from an alkenyl aromatic compound indicates the total content of, for example, the structural units (b-2) in the polymer block (B) and the structural units (c-1) in the polymer block (C) (sometimes, the content of either of these structural units).

The structure of the block copolymer that is a precursor of the hydrogenated diene copolymer is not particularly limited as long as the aforementioned requirements are satisfied. Exemplary structures are those represented by the structural formulae (1) to (6) below.

| | |
|---|---|
| $(A-B)_{n1}$ | Structural formula (1): |
| $(A-B)_{n2}-A$ | Structural formula (2): |
| $(B-A)_{n3}B$ | Structural formula (3): |
| $(A-B-C)_{n4}$ | Structural formula (4): |
| $A-(B-C)_{n5}$ | Structural formula (5): |
| $(A-B)_{n6}-C$ | Structural formula (6): |

In the structural formulae (1) to (6), the letters A, B and C indicate the polymer block (A), the polymer block (B) and the polymer block (C), respectively, and n1 to n6 each indicate an integer of 1 or greater.

In the case where the block copolymer represented by any of the above structural formulae (1) to (6) contains two or more polymer blocks of at least one category of the polymer blocks (A), the polymer blocks (B) and the polymer blocks (C), such polymer blocks of the same category may be the same as or different from one another.

Exemplary structures of the block copolymer further include those represented by the following structural formulae (7) to (12) in which the copolymer blocks are extended or branched through a coupling agent residue.

| | |
|---|---|
| $(A-B)_m X$ | Structural formula (7): |
| $(B-A)_m X$ | Structural formula (8): |
| $(A-B-A)_m X$ | Structural formula (9): |
| $(B-A-B)_m X$ | Structural formula (10): |
| $(A-B-C)_m X$ | Structural formula (11): |
| $(A-B-C)X(C-B)$ | Structural formula (12): |

In the structural formulae (7) to (12), the letters A, B and C indicate the polymer block (A), the polymer block (B) and the polymer block (C), respectively, the letter m indicates an integer of 2 or greater, and the letter X indicates a coupling agent residue.

Of the structures represented by the structural formulae (1) to (12), it is preferable that the structure of the block copolymer be represented by the structural formula (1), (3), (4) or (7).

The coupling ratio in the block copolymer is preferably 50 to 90% in view of the processability of a thermal storage medium as well as paraffin bleeding properties. The term coupling ratio refers to the proportion of molecules connected to each other through a coupling agent.

Examples of the coupling agents include 1,2-dibromoethane, methyldichlorosilane, dimethyldichlorosilane, trichlorosilane, methyltrichlorosilane, tetrachlorosilane, tetramethoxysilane, divinylbenzene, diethyl adipate, dioctyl adipate, benzene-1,2,4-triisocyanate, tolylene diisocyanate, epoxidized 1,2-polybutadiene, epoxidized linseed oil, tetrachlorogermanium, tetrachlorotin, butyltrichlorotin, butyltrichlorosilane, dimethylchlorosilane, 1,4-chloromethylbenzene and bis(trichlorosilyl)ethane.

For example, the block copolymer may be produced by any of the methods described in Japanese Patent Nos. 3134504 and 3360411.

The block copolymers such as those described above may be used singly, or two or more kinds may be used in combination. Examples of the combinations of block copolymers include A-B-A/A-B, $(A-B)_2$-X/A-B, $(A-B)_4$-X/A-B, $(A-B)_4$-X/$(A-B)_2$-X/A-B, $(A-B)_4$-X/$(A-B)_3$-X/$(A-B)_2$-X/A-B, A-B-C/A-B, $(A-B-C)_2$/A-B and $(A-B-C)_2$-X/A-B (wherein the letters A, B and C indicate the polymer block (A), the polymer block (B) and the polymer block (C), respectively, and the letter X indicates a coupling agent residue).

(Properties of Hydrogenated Diene Copolymer)

The hydrogenated diene copolymer preferably has a weight average molecular weight relative to polystyrenes (hereinafter, also referred to as "Mw") of 10,000 to 700,000, more preferably 100,000 to 500,000, and particularly preferably 200,000 to 500,000. In order to obtain desired mechanical properties, Mw is preferably 10,000 or more. In order to ensure fluidity of the thermal storage medium when being shaped, Mw is preferably 700,000 or less.

It is preferable that the hydrogenated diene copolymer have a melting peak at 70 to 140° C. according to differential scanning calorimetry (DSC). It is more preferable that the melting peak be observed in the range of 80 to 120° C.

The melt flow rate (hereinafter, also referred to as "MFR") of the hydrogenated diene copolymer is not particularly limited. However, it is generally preferable that the melt flow rate be 0.01 to 100 g/10 min. In this specification, MFR refers to a value measured at 230° C. and 98.1 N in accordance with JIS K7210.

The hydrogenated diene copolymers may be used singly, or two or more kinds of hydrogenated diene copolymers may be used in combination. Examples of the combinations of hydrogenated diene copolymers include hydrogenated A-B-A/hydrogenated A-B, hydrogenated $(A-B)_2$-X/hydrogenated A-B, hydrogenated $(A-B)_4$-X/hydrogenated A-B, hydrogenated $(A-B)_4$-X/hydrogenated $(A-B)_2$-X/hydrogenated A-B, hydrogenated $(A-B)_4$-X/hydrogenated $(A-B)_3$-X/hydrogenated $(A-B)_2$-X/hydrogenated A-B, hydrogenated A-B-C/A-B, hydrogenated $(A-B-C)_2$/hydrogenated A-B, and hydrogenated $(A-B-C)_2$-X/hydrogenated A-B (wherein the letters A, B and C indicate the polymer block (A), the polymer block (B) and the polymer block (C), respectively, and the letter X indicates a coupling agent residue).

Because the polymer block (A) has a vinyl bond content of not more than 20 mol %, the hydrogenation of this polymer block results in a polymer block structure which is similar to polyethylene and has good crystallinity. Because the polymer block (B) has a vinyl bond content of 30 to 95 mol %, the hydrogenation of this polymer block (B), for example in the case where the second conjugated diene compound is 1,3-butadiene, results in a polymer block structure which is similar to a rubber-like ethylene/butylene copolymer and exhibits flexibility. Accordingly, in the case where the first and the second conjugated diene compounds are 1,3-butadiene, the hydrogenated diene copolymer obtained has an olefin crystal-ethylene/butylene-olefin crystal block copolymer structure. The use of a hydrogenated diene copolymer with such a structure results in a thermal storage medium composition which can give a thermal storage medium exhibiting in particular excellent fluidity when being shaped.

(Processes for Producing Hydrogenated Diene copolymers)

The hydrogenated diene copolymer may be produced by any process without limitation. For example, it may be produced by preparing the block copolymer and hydrogenating the block copolymer. The block copolymer may be prepared by, for example, carrying out the living anionic polymerization of the first conjugated diene compound in an inert organic solvent in the presence of an organic alkali metal compound as a polymerization initiator, subsequently the living anionic polymerization of the second conjugated diene compound optionally together with the alkenyl aromatic compound, and optionally the living anionic polymerization of the alkenyl aromatic compound as required.

Examples of the inert organic solvents include aliphatic hydrocarbon solvents such as pentane, hexane, heptane and octane; alicyclic hydrocarbon solvents such as cyclopentane, methylcyclopentane, cyclohexane and methylcyclohexane; and aromatic hydrocarbon solvents such as benzene, xylene, toluene and ethylbenzene.

When a coupling agent residue is to be introduced into the block copolymer, such a residue may be easily introduced by inducing a reaction by adding the coupling agent after the living anionic polymerization of the second conjugated diene compound without any operations such as separation.

In the living anionic polymerization, the vinyl bond content in the polymer block (B) may be easily controlled by appropriately selecting, for example, the kind and the amount of a reagent such as an ether compound, a tertiary amine or an alkoxide, phenoxide or sulfonate of an alkali metal (for example, sodium or potassium).

By the hydrogenation of the block copolymer, the hydrogenated diene copolymer may be easily produced. The process for the hydrogenation of the block copolymer and the reaction conditions are not particularly limited. For example, the block copolymer may be usually hydrogenated at 20 to 150° C. and 0.1 to 10 MPa hydrogen pressure in the presence of a hydrogenation catalyst. In this case, the hydrogenation ratio may be controlled appropriately by changing reaction conditions, for example the amount of a hydrogenation catalyst, the hydrogen pressure during the hydrogenation reaction, or the reaction time.

Examples of the hydrogenation catalysts include those described in JP-A-1989-275605, JP-A-1993-271326, JP-A-1993-271325, JP-A-1993-222115, JP-A-1991-292924, JP-A-2000-37632, JP-A-1984-133203, JP-A-1988-5401, JP-A-1987-218403, JP-A-1995-90017, JP-B-1968-19960 and JP-B-1972-40473. The hydrogenation catalysts may be used singly, or two or more kinds may be used in combination.

In order to meet desired shape retention properties and mechanical properties, the hydrogenated diene copolymer has a hydrogenation ratio of not less than 90%, and preferably not less than 95% with respect to the double bonds derived from the conjugated diene compounds (including the first conjugated diene compound and the second conjugated diene compound).

After the hydrogenation, the catalyst residue is removed as required, or a phenolic or amine anti-aging agent is added as required. Thereafter, the hydrogenated diene copolymer is isolated from the solution of the hydrogenated diene copolymer. For example, the hydrogenated diene copolymer may be isolated by a method in which acetone, alcohol or the like is added to the hydrogenated diene copolymer solution so as to precipitate the copolymer, a method in which the hydrogenated diene copolymer solution is added to hot water while performing stirring so as to distill away the solvent, or a method in which an appropriate amount of a paraffin compound to be added into the thermal storage medium composition is mixed together with the hydrogenated diene copolymer solution beforehand, and the solution is added to hot water while performing stirring so as to distill away the solvent.

2. Paraffin Compounds

The paraffin compound contained in the thermal storage medium composition according to the invention has 12 to 50 carbon atoms. It is preferable that the paraffin compound have a methylene chain of 10 to 30 carbon atoms.

Specific examples of the paraffin compounds include linear paraffins such as n-tetradecane, n-pentadecane, n-hexadecane, n-heptadecane, n-octadecane, n-nonadecane, n-icosane, n-docosane, n-tetracosane, n-hexacosane, n-octacosane and n-triacontane, and branched paraffins. The paraffin compounds may be used singly, or two or more kinds may be used in combination.

From the viewpoint of effective utilization of heat in the living temperature range, it is preferable that the paraffin compound show a melting peak at 0 to 70° C. according to differential scanning calorimetry (DSC). As described hereinabove, $T_{max}$, usually corresponds to this melting peak temperature. In view of properties of a thermal storage medium comprising the thermal storage medium composition, it is preferable that the melting peak of the hydrogenated diene copolymer be higher than the melting peak of the paraffin compound. From the viewpoint of shape retention properties, it is preferable that the melting peak of the hydrogenated diene copolymer be 10° C. or more higher than the melting peak of the paraffin compound.

The melting peak temperatures of the aforementioned paraffin compounds are described in parentheses below: n-tetradecane (6° C.), n-pentadecane (0° C.), n-hexadecane (18° C.) n-heptadecane (21° C.), n-octadecane (28° C.), n-nonadecane (32° C.), n-icosane (37° C.), n-docosane (46° C.), n-tetracosane (51° C.), n-hexacosane (57° C.), n-octacosane (62° C.) and n-triacontane (66° C.)

The content of the paraffin compound is 50 to 4000 parts by mass, preferably 300 to 3000 parts by mass, and more preferably 400 to 2000 parts by mass with respect to 100 parts by mass of the hydrogenated diene copolymer. In order to make sure that a thermal storage medium comprising the thermal storage medium composition has a sufficient latent heat, the content is preferably 50 parts by mass or more. In order to prevent a decrease in shape retention properties and the bleeding of the paraffin compound at or above $T_{max}$, the content is preferably 4000 parts by mass or less.

3. Other Components:

The thermal storage medium composition according to the present invention may comprise a filler in order to achieve a function in accordance with a use application while still exhibiting the advantageous effects of the invention. Examples of the fillers include colorants such as titanium oxide and carbon black, metal powders such as ferrite, inorganic fibers such as glass fibers and metal fibers, organic fibers such as carbon fibers and aramid fibers, thermal conductive agents such as aluminum nitride, boron nitride, aluminum hydroxide, alumina, magnesium oxide, carbon nanotubes and expanded graphite, glass beads, glass balloons, glass flakes, glass fibers, asbestos, calcium carbonate, magnesium carbonate, inorganic whiskers such as potassium titanate whisker and zinc oxide whisker, and filling materials such as talc, silica, calcium silicate, kaolin, diatomaceous earth, montmorillonite, graphite, pumice, ebonite powder, cotton flock, cork powder, barium sulfate and fluororesins. Carbon fibers and expanded graphite are preferable in terms of conductive properties. The fillers may be used singly, or two or more kinds may be used in combination.

In addition to the filler, the thermal storage medium composition of the invention may further comprise other components while still achieving the advantageous effects of the invention. Exemplary additional components include antioxidants, antistatic agents, weathering agents, UV absorbents, anti-blocking agents, nucleating agents, flame retardants, vulcanizing agents, vulcanization auxiliaries, antibacterial agents, antifungal agents, dispersants, coloring inhibitors, foaming agents and antirust agents.

The content of the filler is variable in accordance with the type and a desired function. In order to ensure good productivity when the thermal storage medium composition is packed into a container, it is desirable that the content is such that the thermal storage medium composition maintains fluidity at or above the melting peak temperature of the hydrogenated diene copolymer.

The content of the filler is preferably 0.01 to 50% by mass, more preferably 0.1 to 40% by mass, and particularly preferably 1 to 30% by mass with respect to 100% by mass of the thermal storage medium composition. A content of 1% by mass or more is particularly preferable in order to give a desired function to the thermal storage medium composition. A content of 30% by mass or less is particularly preferable in order to ensure that the thermal storage medium composition exhibits fluidity when being packed into a container and allows for high productivity.

A compound such as porous silica or porous expanded graphite is a preferred filler because such a filler allows the components of the thermal storage medium composition to enter deep into the pores, thus achieving a desired function with a small amount.

Exemplary porous silicas include conventional silica foams.

Porous expanded graphite may be prepared by a known method. For example, a graphite material such as natural graphite, pyrolytic graphite or kish graphite may be immersed into a mixed acid containing a strong acid such as concentrated sulfuric acid and a strong oxidant such as an aqueous perchloric acid solution or nitric acid so as to form an intercalation compound, and the intercalation compound may be heat treated at usually 100° C. or above, preferably 500° C. or above to give porous expanded graphite. The bulk density of the expanded graphite may be controlled by regulating the acid treatment conditions or the conditions in the heat treatment after the acid treatment. Alternatively, expanded graphite with a high bulk density may be prepared first and may be mechanically treated by, for example, compression or crushing into a desired bulk density.

II. Thermal Storage Media:

A thermal storage medium according to the present invention comprises the thermal storage medium composition described in "I. Thermal storage medium compositions". Exemplary shapes of the storage media include sheets, particles and pellets. The thermal storage medium may be formed by any method without limitation. An exemplary method is described below.

First, the thermal storage medium composition comprising the paraffin compound and the hydrogenated diene copolymer are prepared with a usual mixing and stirring device such as a two-roll mill, an extruder, a twin-screw kneading extruder or a stirring mixer. In the case where a stirrer is used, the hydrogenated diene copolymer and optionally additives such as the filler are added to the molten paraffin compound, and the mixture is stirred. In such a case, improved workability may be obtained by preliminarily forming the hydrogenated diene copolymer into pellets, particles or powder before the addition. The addition is preferably performed at a temperature at which the hydrogenated diene copolymer is plasticized, and is usually carried out at 100 to 200° C.

Next, the thermal storage medium composition that has become in the form of a solution is shaped directly or after being slightly cooled. The composition may be shaped by being poured into a mold having a desired sheet or plate shape. Alternatively, because the thermal storage medium becomes solidified when the temperature is lowered to or below $T_{max}$ of the paraffin compound, the composition may be shaped into a block shape and thereafter cut into sheets or plates. Still alternatively, the thermal storage medium composition may be attached or applied onto a substrate such as a film, cloth or fibers, or such a substrate may be impregnated with the thermal storage medium composition, thus forming a thermal storage medium in a sheet or plate shape. Alternatively, the composition may be packed into a bag such as a polyethylene bag and cooled so as to have a sheet, plate or rod shape. In the case where an extruder is used, the composition may be extruded into a sheet shape or a plate shape. Further, the composition may be extruded into a rod or pipe shape. The thermal storage medium with a rod or pipe shape may be shredded into particles or pellets.

II-1. Thermal Storage Packages:

From the viewpoints of productivity, safety and retention of thermal storage performance, the inventive thermal storage medium composition is preferably used as a thermal storage medium in a configuration in which the thermal storage medium composition is packed into a packaging material (hereinafter, also referred to as "thermal storage package").

Examples of the packaging materials include substrate films known as packaging materials, for example films made of polyolefin resins such as polyethylene (PE) and polypropylene (PP) (polyolefin resin films), films made of polyester resins such as polyethylene terephthalate (PET) (polyester resin films) and films made of oriented nylon (ONy), polyamide (PA), ethylene/vinyl alcohol copolymer (EVOH), and so on; metal foils for temperature uniformity such as aluminum foil; and laminate films obtained by stacking these substrate films and metal foils by a known lamination method.

In view of productivity, the thermal storage medium composition is preferably packed into the packaging material by a method (a heat seal method) in which the thermal storage medium composition is packed with a known packing apparatus into a packaging material that includes a substrate film selected from the aforementioned substrate films and having thermal fusion bonding properties (heat sealing properties) as the innermost layer, and the packaging material is heat sealed with a heat seal bar so as to tightly pack the composition. The substrate film is preferably a polyolefin resin film having thermal fusion bonding properties (hereinafter, also referred to as "thermally fusible olefin layer"), and is particularly preferably a PE film or a PP film.

Because such a PE or PP film has low barrier properties with respect to oils such as paraffin compounds, the use of a packaging material having a single layer of such a film can result in bleeding out of the paraffin compound (oil bleeding).

Thus, it is a more preferred embodiment to use a laminate film as the packaging material which includes a heat seal layer (an innermost layer) and a layer made of a polar resin with oil resistance (hereinafter, the polar resin is also referred to as "oil resistant polar resin", and the layer made of the polar resin is also referred to as "oil resistant polar resin layer").

In the laminate film, the heat seal layer is preferably a thermally fusible olefin layer. A preferred thermally fusible olefin layer is a PE film or a PP film, and a LLDPE (linear low-density polyethylene) film is more preferable from the viewpoint of productivity. Examples of the oil resistant polar resin layer in the laminate film include a PA film and a PET film. The above configuration in which the heat seal layer (the innermost layer) is covered with the oil resistant polar resin layer ensures that oil bleeding is prevented more reliably.

With regard to the thickness of each of the heat seal layer and the oil resistant polar resin layer, the thickness of the heat seal layer is preferably not less than 50 μm and the thickness of the oil resistant polar resin layer is preferably not less than 10 μm in order for these layers to exhibit their functions sufficiently as well as to achieve mechanical strength. In order to add an additional function to these layers, other films such as a heat resistant resin film and a gas barrier resin film may be stacked onto these layers.

For example, packaging materials having the following layer configurations may be used. In the following exemplary layer configurations, the order of layers is such that the outermost to innermost layers are sequentially described from left. The term "film" such as in a PE film is sometimes omitted. A substrate film described in parenthesis may be used in place of the substrate film described to its immediate left.

(1) PA/PE (PP)

When the thermal storage package of the invention is to be sealed by heat sealing, it is preferable that the heat seal layer (the innermost layer) be a thermally fusible olefin layer. PE or PP is particularly preferable as the thermally fusible olefin layer. However, because PE or PP has low barrier properties with respect to oils such as paraffin compounds, the use of a packaging material having a single layer of such a film can result in bleeding of oil (oil bleeding). Thus, such an innermost layer is preferably covered with an oil resistant polar resin (PA, an outermost layer). With regard to the thickness of each of the above substrate films, the thickness of PE and PP is preferably not less than 50 μm and the thickness of PA is preferably not less than 10 μm.

(2) PET/PA/PE (PP)

In some embodiments of use of the thermal storage medium according to the invention, the thermal storage package sometimes requires heat resistance. In the case where PA is used as the substrate film, the outside thereof is preferably covered with PET in order to supplement heat resistance. With regard to the thickness of each of the above substrate films, the thickness of PE and PP is preferably not less than 50 μm, the thickness of PA is preferably not less than 10 μm, and the thickness of PET is preferably not less than 10 μm.

(3) PET (PA) EVOH/PA/PE (PP)

Of the paraffin compounds which is component of the thermal storage medium composition of the invention, those with high volatility such as tetradecane can pass through PA. In such a case, it is preferable that the packaging material further have EVOH as a gas barrier layer. With regard to the thickness of each of the above substrate films, the thickness of PE and PP is preferably not less than 50 μm, the thickness of PA is preferably not less than 10 μm, the thickness of EVOH is preferably not less than 10 μm, and the thickness of PET is preferably not less than 10 μm.

When a packaging material is prepared using the substrate films described in any of (1) to (3), a known method such as coextrusion, dry lamination or heat sealing may be adopted.

EXAMPLES

The present invention will be described in detail by presenting examples hereinbelow without limiting the scope of the invention. In Examples and Comparative Examples, the terms "parts" and "%" are on the mass basis unless otherwise mentioned. The methods used for the measurement and evaluation of properties are described below.

[Ratio (%) of polymer block (A), polymer block (B) and polymer block (C)]: The proportion of the mass of each polymer block relative to the total mass of the polymer block (A), the polymer block (B) and the polymer block (C) was calculated based on the amounts of raw materials used for the production of the block copolymer.

[Vinyl bond contents (mol %) in polymer blocks (A) and (B)]: The vinyl bond contents (mol %) in the polymer blocks (A) and (B) were determined by an infrared analysis method and a Hampton method.

[Weight average molecular weight]: The weight average molecular weight was measured relative to polystyrenes using a gel permeation chromatography (GPC, product name: HLC-8120GPC, manufactured by TOSOH FINECHEM CORPORATION, column: GMH-XL manufactured by TOSOH CORPORATION).

[Coupling ratio (%)]: The waveforms obtained by the above gel permeation chromatography were separated from one another, and the coupling ratio was calculated based on the area ratio of the waveforms.

[Hydrogenation ratio (%)]: The hydrogenation ratio (%) was calculated from a $^1$H-NMR spectrum recorded at 270 MHz using a carbon tetrachloride solution.

[MFR (g/10 min)]: MFR (g/10 min) was measured at 230° C. and 98.1 N load in accordance with JIS K7210.

[Melting peak temperature (° C.)]: With use of a differential scanning calorimeter (DSC), a sample was held at 200° C. for 10 minutes, cooled to –80° C. at a rate of 10° C./min, held at –80° C. for 10 minutes, and heated at a rate of 10° C./min. The temperature corresponding to the peak top of the heat flow (heat of fusion of crystal (J/g)) during the final heating was obtained as the melting peak temperature (° C.).

[Maximum thermal storage temperature (° C.)]: The maximum thermal storage temperature (° C.), which corresponded to a temperature at which the thermal storage medium was melted, was measured with DSC in accordance with JIS K7121. The measurement conditions were the same as those used in the measurement of the melting peak temperature (° C.).

[Latent Heat (kJ/kg)]:

The latent heat (kJ/kg) was measured with DSC in accordance with JIS K7122. The measurement conditions were the same as those used in the measurement of the melting peak temperature (° C.).

[Shape retention properties]: The thermal storage medium was heated in a gear oven set at a temperature that was 20° C. higher than the melting peak temperature of the used paraffin compound. This thermal storage medium which was being heated (namely, which was caused to store heat at above the maximum thermal storage temperature) was visually observed. The thermal storage medium was again visually observed after a day. When the shape of the thermal storage medium was substantially the same as original, the shape retention properties were evaluated to be "AA (good)". When the thermal storage medium had been molten, the shape retention properties were evaluated to be "BB (bad)".

[Bleeding properties]: The thermal storage medium was packed tightly, namely without any airspaces, into a packaging material which was composed of a PE film (80 μm, an innermost layer) and a PA film (15 μm, an outermost layer) stacked together by a dry lamination method. The package was allowed to stand at 50° C. for 24 hours and was visually observed to inspect for any separation of the paraffin compound. The bleeding properties were evaluated to be "AA (good)" when there was substantially no separation, and were evaluated to be "BB (bad)" when an apparent separation was observed.

[Fluidity]: The viscosity of the thermal storage medium was measured at 90° C. using RE80 viscometer manufactured by TOKI SANGYO CO., LTD. which was connected to a 3° x R9.7 rotor. The fluidity was evaluated to be "AA (good)" when the viscosity at a rotational speed of 1 rpm was 0 to less than 30000 mPa·s, and was evaluated to be "BB (bad)" when the viscosity at the rotational speed was 30000 mPa·s or more.

Synthetic Example 1

Preparation of Hydrogenated Diene Copolymer (H-1)

A 50 L volume reaction vessel thoroughly purged with nitrogen was charged with 24000 g of cyclohexane, 1.2 g of tetrahydrofuran, 600 g of 1,3-butadiene and 2.5 g of n-butyllithium. Polymerization was carried out at a polymerization initiation temperature of 70° C. After the completion of the reaction, the temperature was controlled so as to be 40° C., and 112 g of tetrahydrofuran was added. Adiabatic polymerization was carried out while successively adding 2400 g of 1,3-butadiene. Thereafter, 2.0 g of methyldichlorosilane was added to the system, and the reaction was carried out for 30 minutes, thereby preparing a block copolymer.

The prepared block copolymer was found to include a polymer block (A) containing structural units derived from 1,3-butadiene and having a vinyl bond content of 14 mol %, and a polymer block (B) containing structural units derived from 1,3-butadiene and having a vinyl bond content of 46 mol %. In the block copolymer, the weight average molecular weight was 280,000 and the coupling ratio was 80%.

Subsequently, the reaction liquid containing the block copolymer was brought to 80° C., and 2.0 g of bis(cyclopentadienyl)titanium furfuryloxychloride and 1.2 g of n-butyllithium were added. The reaction was carried out for 2 hours while maintaining the hydrogen pressure at 1.0 MPa. After the reaction, the reaction liquid was brought back to normal temperature and normal pressure and was withdrawn from the reaction vessel. The liquid was then poured into water while performing stirring. The solvent was removed by steam distillation. Thus, a target hydrogenated diene copolymer (H-1) was prepared. The hydrogenated diene copolymer (H-1) had a hydrogenation ratio of 98%, MFR of 3.5 g/10 min and a melting peak temperature of 96.4° C.

Synthetic Example 2

Preparation of Hydrogenated Diene Copolymer (H-2)

A hydrogenated diene copolymer (H-2) was prepared in the same manner as in Synthetic Example 1, except that the amounts of 1,3-butadiene used in the polymerization reaction for the polymer blocks (A) and (B) were changed to 900 g and 2100 g, respectively, and the amount of n-butyllithium was changed to 5.0 g, that the amount of tetrahydrofuran used in the polymerization reaction for the polymer block (B) was changed to 125 g, and that methyldichlorosilane was replaced by tetrachlorosilane.

Synthetic Example 3

Preparation of Hydrogenated Diene Copolymer (H-3)

A hydrogenated diene copolymer (H-3) was prepared in the same manner as in Synthetic Example 1, except that the amounts of 1,3-butadiene used in the polymerization reaction for the polymer blocks (A) and (B) were changed to 450 g and 2550 g, respectively.

Synthetic Example 4

Preparation of Hydrogenated Diene Copolymer (H-4)

A hydrogenated diene copolymer (H-4) was prepared in the same manner as in Synthetic Example 1, except that the amounts of 1,3-butadiene used in the polymerization reaction for the polymer blocks (A) and (B) were changed to 1200 g and 1800 g, respectively, and that the amount of tetrahydrofuran used in the polymerization reaction for the polymer block (B) was changed to 145 g.

Synthetic Example 5

Preparation of Hydrogenated Diene Copolymer (H-5)

A hydrogenated diene copolymer (H-5) was prepared in the same manner as in Synthetic Example 1, except that the amounts of 1,3-butadiene used in the polymerization reaction for the polymer blocks (A) and (B) were changed to 900 g and 2100 g, respectively, and that the amount of tetrahydrofuran used in the polymerization reaction for the polymer block (B) was changed to 175 g.

Synthetic Example 6

Preparation of Hydrogenated Diene Copolymer (H-6)

A hydrogenated diene copolymer (H-6) was prepared in the same manner as in Synthetic Example 1, except that the amounts of 1,3-butadiene used in the polymerization reaction for the polymer blocks (A) and (B) were changed to 900 g and 2100 g, respectively, and the amount of n-butyllithium was changed to 2.3 g, and that the amount of tetrahydrofuran used in the polymerization reaction for the polymer block (B) was changed to 80 g.

Synthetic Example 7

Preparation of Hydrogenated Diene Copolymer (H-7)

A hydrogenated diene copolymer (H-7) was prepared in the same manner as in Synthetic Example 1, except that the amounts of 1,3-butadiene used in the polymerization reaction for the polymer blocks (A) and (B) were changed to 900 g and 2100 g, respectively, and that the amount of tetrahydrofuran used in the polymerization reaction for the polymer block (B) was changed to 270 g.

Synthetic Example 8

Preparation of Hydrogenated Diene Copolymer (H-8)

A hydrogenated diene copolymer (H-8) was prepared in the same manner as in Synthetic Example 1, except that the amounts of 1,3-butadiene used in the polymerization reaction for the polymer blocks (A) and (B) were changed to 900 g and 2100 g, respectively, and the amount of n-butyllithium was changed to 1.0 g, and that methyldichlorosilane was not used but chlorotrimethylsilane was added after the completion of the polymerization reaction for the polymer block (B) to completely terminate the reaction.

Synthetic Example 9

Preparation of Hydrogenated Diene Copolymer (H-9)

A hydrogenated diene copolymer (H-9) was prepared in the same manner as in Synthetic Example 1, except that the amount of 1,3-butadiene used in the polymerization reaction for the polymer block (A) was changed to 900 g, that the amount of tetrahydrofuran used in the polymerization reaction for the polymer block (B) was changed to 100 g, and that 2400 g of 1,3-butadiene used in the polymerization reaction for the polymer block (B) was replaced by 2100 g of isoprene.

Synthetic Example 10

Preparation of Hydrogenated Diene Copolymer (H-10)

A hydrogenated diene copolymer (H-10) was prepared in the same manner as in Synthetic Example 1, except that the amounts of 1,3-butadiene used in the polymerization reaction for the polymer blocks (A) and (B) were changed to 900 g and 1680 g, respectively, and that 420 g of styrene was used in addition to 1,3-butadiene in the polymerization reaction for the polymer block (B).

Synthetic Example 11

Preparation of Hydrogenated Diene Copolymer (H-11)

A 50 L volume reaction vessel thoroughly purged with nitrogen was charged with 24000 g of cyclohexane, 0.6 g of tetrahydrofuran, 900 g of 1,3-butadiene and 1.3 g of n-butyllithium. Polymerization was carried out at a polymerization initiation temperature of 70° C. After the completion of the reaction, the temperature was controlled so as to be 40° C., and 65 g of tetrahydrofuran was added. Adiabatic polymerization was carried out while successively adding 4200 g of 1,3-butadiene. After the completion of the reaction, 900 g of styrene was further added, and the polymerization was carried out at 70° C. The hydrogenation reaction was carried out in the same manner as in Synthetic Example 1. Thus, a hydrogenated diene copolymer (H-11) was prepared.

Synthetic Example 12 Preparation of hydrogenated diene copolymer (H-12)

A hydrogenated diene copolymer (H-12) was prepared in the same manner as in Synthetic Example 1, except that the amounts of 1,3-butadiene used in the polymerization reaction for the polymer blocks (A) and (B) were changed to 120 g and 2880 g, respectively, and that the amount of tetrahydrofuran used in the polymerization reaction for the polymer block (B) was changed to 145 g.

Synthetic Example 13

Preparation of Hydrogenated Diene Copolymer (H-13)

A hydrogenated diene copolymer (H-13) was prepared in the same manner as in Synthetic Example 1, except that the amounts of 1,3-butadiene used in the polymerization reaction for the polymer blocks (A) and (B) were changed to 1560 g and 1440 g, respectively, and the amount of n-butyllithium was changed to 3.0 g, and that the amount of tetrahydrofuran used in the polymerization reaction for the polymer block (B) was changed to 145 g.

Properties of the hydrogenated diene copolymers (H-1) to (H-13) are described in Table 1.

TABLE 1

| | Syn. Ex. 1 | Syn. Ex. 2 | Syn. Ex. 3 | Syn. Ex. 4 | Syn. Ex. 5 | Syn. Ex. 6 | Syn. Ex. 7 |
|---|---|---|---|---|---|---|---|
| Block copolymer | $(A-B)_2-X$ | $(A-B)_4-X$ | $(A-B)_2-X$ | $(A-B)_2-X$ | $(A-B)_2-X$ | $(A-B)_2-X$ | $(A-B)_2-X$ |
| Proportion of polymer block (A) (%) | 20 | 30 | 14 | 38 | 30 | 30 | 30 |
| Proportion of polymer block (B) (%) | 80 | 70 | 86 | 62 | 70 | 70 | 70 |
| Proportion of polymer block (C) (%) | 0 | 0 | 0 | 0 | 0 | 0 | 0 |
| First conjugated diene compound | Butadiene | Butadiene | Butadiene | Butadiene | Butadiene | Butadiene | Butadiene |
| Content of structural units (a-1) in polymer block (A) (%) | 100 | 100 | 100 | 100 | 100 | 100 | 100 |
| Vinyl bond content in polymer block (A) (mol %) | 14 | 15 | 14 | 15 | 17 | 15 | 14 |
| Second conjugated diene compound | Butadiene | Butadiene | Butadiene | Butadiene | Butadiene | Butadiene | Butadiene |
| Content of structural units (b-1) in polymer block (B) (%) | 100 | 100 | 100 | 100 | 100 | 100 | 100 |
| Alkenyl aromatic compound | — | — | — | — | — | — | — |
| Content of structural units (b-2) in polymer block (B) (%) | — | — | — | — | — | — | — |
| Vinyl bond content in polymer block (B) (mol %) | 46 | 48 | 45 | 50 | 55 | 41 | 68 |
| Coupling ratio (%) | 80 | 79 | 78 | 81 | 83 | 77 | 80 |
| Weight average molecular weight (×10000) | 28 | 32 | 28 | 32 | 29 | 27 | 33 |
| Hydrogenated diene copolymer | H-1 | H-2 | H-3 | H-4 | H-5 | H-6 | H-7 |
| Hydrogenation ratio (%) | 98 | 98 | 98 | 98 | 97 | 97 | 98 |
| MFR (g/10 min) | 3.5 | 0.5 | 5.3 | 0.5 | 1.2 | 2 | 5.7 |
| Melting peak temperature (° C.) | 96.4 | 94.4 | 96.2 | 95.1 | 90.1 | 94.3 | 96.9 |

| | Syn. Ex. 8 | Syn. Ex. 9 | Syn. Ex. 10 | Syn. Ex. 11 | Syn. Ex. 12 | Syn. Ex. 13 |
|---|---|---|---|---|---|---|
| Block copolymer | $(A-B)$ | $(A-B)_2-X$ | $(A-B)_2-X$ | $A-B-C$ | $(A-B)_2-X$ | $(A-B)_2-X$ |
| Proportion of polymer block (A) (%) | 30 | 30 | 30 | 15 | 4 | 52 |
| Proportion of polymer block (B) (%) | 70 | 70 | 70 | 70 | 96 | 48 |
| Proportion of polymer block (C) (%) | 0 | 0 | 0 | 15 | 0 | 0 |
| First conjugated diene compound | Butadiene | Butadiene | Butadiene | Butadiene | Butadiene | Butadiene |
| Content of structural units (a-1) in polymer block (A) (%) | 100 | 100 | 100 | 100 | 100 | 100 |
| Vinyl bond content in polymer block (A) (mol %) | 15 | 15 | 15 | 14 | 15 | 15 |
| Second conjugated diene compound | Butadiene | Isoprene | Butadiene | Butadiene | Butadiene | Butadiene |
| Content of structural units (b-1) in polymer block (B) (%) | 100 | 100 | 80 | 100 | 100 | 100 |
| Alkenyl aromatic compound | — | — | Styrene | — | — | — |
| Content of structural units (b-2) in polymer block (B) (%) | — | — | 20 | — | — | — |
| Vinyl bond content in polymer block (B) (mol %) | 47 | 42 | 43 | 52 | 50 | 50 |

TABLE 1-continued

| | | | | | | |
|---|---|---|---|---|---|---|
| Coupling ratio (%) | — | 79 | 76 | — | 80 | 78 |
| Weight average molecular weight (×10000) | 22 | 30 | 30 | 25 | 34 | 23 |
| Hydrogenated diene copolymer | H-8 | H-9 | H-10 | H-11 | H-12 | H-13 |
| Hydrogenation ratio (%) | 98 | 96 | 98 | 98 | 98 | 99 |
| MFR (g/10 min) | 14 | 6 | 0.5 | 1.6 | 7.3 | 0.1 |
| Melting peak temperature (° C.) | 94.7 | 94.6 | 94.5 | 95.5 | 94.6 | 94.5 |

Synthetic Example 14

Preparation of Hydrogenated Diene Copolymer (R-1)

A hydrogenated diene copolymer (R-1) was prepared in the same manner as in Synthetic Example 1, except that the amounts of 1,3-butadiene used in the polymerization reaction for the polymer blocks (A) and (B) were changed to 900 g and 2100 g, respectively, and that the amount of tetrahydrofuran used in the polymerization reaction for the polymer block (A) was changed to 5 g.

Synthetic Example 15

Preparation of Hydrogenated Diene Copolymer (R-2)

A hydrogenated diene copolymer (R-2) was prepared in the same manner as in Synthetic Example 1, except that the amounts of 1,3-butadiene used in the polymerization reaction for the polymer blocks (A) and (B) were changed to 900 g and 2100 g, respectively, and that the amount of tetrahydrofuran used in the polymerization reaction for the polymer block (B) was changed to 5 g.

Synthetic Example 16

Preparation of hydrogenated diene copolymer (R-3)

A hydrogenated diene copolymer (R-3) was prepared in the same manner as in Synthetic Example 1, except that the amounts of 1,3-butadiene used in the polymerization reaction for the polymer blocks (A) and (B) were changed to 900 g and 2100 g, respectively, that the amount of tetrahydrofuran used in the polymerization reaction for the polymer block (B) was changed to 145 g, and that the reaction time in the hydrogenation reaction was changed to 1 hour.

Properties of the hydrogenated diene copolymers (R-1) to (R-3) are described in Table 2.

TABLE 2

| | Syn. Ex. 14 | Syn. Ex. 15 | Syn. Ex. 16 |
|---|---|---|---|
| | Block copolymer | | |
| Structure | (A-B)$_2$-X | (A-B)$_2$-X | (A-B)$_2$-X |
| Proportion of polymer block (A) (%) | 30 | 30 | 30 |
| Proportion of polymer block (B) (%) | 70 | 70 | 70 |
| First conjugated diene compound | Butadiene | Butadiene | Butadiene |
| Content of structural units (a-1) in polymer block (A) (%) | 100 | 100 | 100 |
| Vinyl bond content in polymer block (A) (mol %) | 23 | 15 | 15 |
| Second conjugated diene compound | Butadiene | Butadiene | Butadiene |
| Content of structural units (b-1) in polymer block (B) (%) | 100 | 100 | 100 |
| Alkenyl aromatic compound | — | — | — |
| Content of structural units (b-2) in polymer block (B) (%) | — | — | — |
| Vinyl bond content in polymer block (B) (mol %) | 49 | 28 | 52 |
| Coupling ratio (%) | 81 | 84 | 77 |
| Weight average molecular weight (×10000) | 27 | 30 | 29 |
| Hydrogenated diene copolymer | R-1 | R-2 | R-3 |
| Hydrogenation ratio (%) | 96 | 98 | 87 |
| MFR (g/10 min) | 6.8 | 0.1 | 20 |
| Melting peak temperature (° C.) | 68.3 | 94.2 | 60.7 |

Example 1

Production of Thermal Storage Medium

In a glass flask, 100 parts of the hydrogenated diene copolymer (H-1) from Synthetic Example 1, 900 parts of n-hexadecane as a paraffin compound and 5 parts of IRGANOX 1010 (manufactured by BASF) as an antioxidant were mixed together while performing heating at 120° C., thereby producing a thermal storage medium. The thermal storage medium had a maximum thermal storage temperature of 22° C. and a latent heat (an amount of stored heat) of 186 kJ/kg, and was evaluated to be "AA (good)" in terms of shape retention properties, "AA (good)" in terms of bleeding properties and "AA (good)" in terms of fluidity.

Examples 2 to 16

Production of Thermal Storage Media

Thermal storage media were produced in the same manner as in Example 1, except that the formulation was changed as described in Table 3.

The results of the measurements and evaluations with respect to the thermal storage media are described in Table 3.

TABLE 3

|  |  | Ex. 1 | Ex. 2 | Ex. 3 | Ex. 4 | Ex. 5 | Ex. 6 | Ex. 7 | Ex. 8 |
|---|---|---|---|---|---|---|---|---|---|
| [Formulation] | | | | | | | | | |
| Polymer | Type | H-1 | H-2 | H-3 | H-4 | H-5 | H-6 | H-7 | H-8 |
|  | Amount (parts) | 100 | 100 | 100 | 100 | 100 | 100 | 100 | 100 |
| Paraffin compound | Type | P-1 | P-1 | P-1 | P-1 | P-2 | P-1 | P-1 | P-5 |
|  | Maximum crystal transition temperature (° C.) (melting peak temperature) | 18 | 18 | 18 | 18 | 6 | 18 | 18 | 51 |
|  | Amount (parts) | 900 | 900 | 900 | 900 | 900 | 900 | 900 | 700 |
| Antioxidant | Amount (parts) | 5 | 5 | 5 | 5 | 5 | 5 | 5 | 5 |
| [Properties of thermal storage medium] | | | | | | | | | |
| Maximum thermal storage temperature (° C.) | | 22 | 25 | 23 | 23 | 10 | 23 | 22 | 56 |
| Latent heat (amount of stored heat) (kJ/kg) | | 186 | 195 | 196 | 187 | 195 | 191 | 196 | 131 |
| Shape retention properties | | AA | AA | AA | AA | AA | AA | AA | AA |
| Bleeding properties | | AA | AA | AA | AA | AA | AA | AA | AA |
| Fluidity (mPa·s) | | 880 | 970 | 860 | 710 | 600 | 630 | 510 | 460 |
|  | | AA | AA | AA | AA | AA | AA | AA | AA |

|  |  | Ex. 9 | Ex. 10 | Ex. 11 | Ex. 12 | Ex. 13 | Ex. 14 | Ex. 15 | Ex. 16 |
|---|---|---|---|---|---|---|---|---|---|
| [Formulation] | | | | | | | | | |
| Polymer | Type | H-9 | H-10 | H-1 | H-1 | H-1 | H-11 | H-12 | H-13 |
|  | Amount (parts) | 100 | 100 | 100 | 100 | 100 | 100 | 100 | 100 |
| Paraffin compound | Type | P-3 | P-4 | P-1 | P-1 | P-1 | P-1 | P-1 | P-1 |
|  | Maximum crystal transition temperature (° C.) (melting peak temperature) | 28 | 37 | 18 | 18 | 18 | 18 | 18 | 18 |
|  | Amount (parts) | 900 | 1100 | 550 | 3600 | 90 | 900 | 900 | 900 |
| Antioxidant | Amount (parts) | 5 | 5 | 5 | 5 | 5 | 5 | 5 | 5 |
| [Properties of thermal storage medium] | | | | | | | | | |
| Maximum thermal storage temperature (° C.) | | 34 | 41 | 24 | 19 | 25 | 24 | 22 | 23 |
| Latent heat (amount of stored heat) (kJ/kg) | | 210 | 216 | 177 | 215 | 111 | 190 | 184 | 190 |
| Shape retention properties | | AA | AA | AA | AA | AA | AA | BB | AA |
| Bleeding properties | | AA | AA | AA | AA | AA | AA | AA | BB |
| Fluidity (mPa·s) | | 1010 | 520 | 6500 | 360 | 21000 | 8500 | 600 | 740 |
|  | | AA | AA | AA | AA | AA | AA | AA | AA |

The types of the paraffin compounds used in Examples 1 to 16 are described below.

P-1: n-hexadecane
P-2: n-tetradecane
P-3: n-octadecane
P-4: n-icosane
P-5: n-tetracosane From Table 3, the thermal storage media which comprised the inventive thermal storage medium composition were free from phase separation or liquid phase bleeding and exhibited excellent shape retention properties at or above $T_{max}$ of the paraffin compound contained in the storage media, and were shown to be excellent in fluidity when being shaped.

Comparative Examples 1 to 7

Production of Thermal Storage Media

Thermal storage media were produced in the same manner as in Example 1, except that the formulation was changed as described in Table 4.

The results of the measurements and evaluations with respect to the thermal storage media are described in Table 4.

TABLE 4

|  |  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|
| [Formulation] | | | | | | | | |
| Poylmer | Type | R-1 | R-2 | R-3 | H-1 | SEBS | PE | EPDM |
|  | Amount (parts) | 100 | 100 | 100 | 100 | 100 | 100 | 100 |
| Paraffin compound | Type | P-1 | P-1 | P-1 | P-1 | P-1 | P-1 | P-1 |
|  | Maximum crystal transition temperature (° C.) (melting peak temperature) | 18 | 18 | 18 | 18 | 18 | 18 | 18 |
|  | Amount (parts) | 900 | 900 | 900 | 5000 | 900 | 900 | 900 |
| Antioxidant | Amount (parts) | 5 | 5 | 5 | 5 | 5 | 5 | 5 |
| [Properties of thermal storage medium] | | | | | | | | |
| Maximum thermal storage temperature (° C.) | | 23 | 22 | 23 | 19 | 21 | 21 | 19 |
| Latent heat (amount of stored heat) (kJ/kg) | | 191 | 188 | 189 | 211 | 194 | 186 | 187 |

TABLE 4-continued

|  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| Shape retention properties | BB | AA | BB | BB | AA | AA | BB |
| Bleeding properties | AA | BB | AA | BB | AA | BB | BB |
| Fluidity (mPa · s) | 860 | 1450 | 620 | 320 | Unmeasurable | 650 | 2250 |
|  | AA | AA | AA | AA | BB | AA | AA |

The types of SEBS, PE and EPDM used in Comparative Examples 5, 6 and 7, respectively, are described below.

SEBS: KRATON G1651 (manufactured by KRATON POLYMERS)
PE: HF313 (manufactured by Japan Polyethylene Corporation)
EPDM: JSR EP103AF (manufactured by JSR Corporation)

Example A1

In a glass flask, 100 parts of the thermal storage medium obtained in Example 1 was heated to 120° C., and 20 parts of silica foam (product name: "NS-K" manufactured by Tosoh Silica Corporation) as a filler was added and mixed with the thermal storage medium. Thus, a filler-containing thermal storage medium was produced.

Example A2 and Comparative Example A1

Filler-containing thermal storage media were produced in the same manner as in Example A1, except that the formulation in Example A1 was changed as described in Table 5.

[Dispersion stability]: The molten filler-containing thermal storage medium was packed tightly, namely without any airspaces, into a glass bottle 30 mm in diameter and 100 mm in height, and the bottle was closed with a lid, thereby preparing a test piece for evaluation. The glass bottle was placed into a gear oven set at 50° C. and was allowed to stand for 10 days. Thereafter, an upper portion of the thermal storage medium was collected and analyzed to determine the viscosity of the thermal storage medium at 90° C. using RE80 viscometer manufactured by TOKI SANGYO CO., LTD. which was connected to a 3° x R9. 7 rotor. The dispersion stability was evaluated to be "AA (good)" when the viscosity at a rotational speed of 1 rpm was the original viscosity±less than 5%, and was evaluated to be "BB (bad)" when the difference was greater.

TABLE 5

|  | Ex. A1 | Ex. A2 | Comp. Ex. A1 |
|---|---|---|---|
| Filler-containing thermal storage medium | | | |
| Type of thermal storage medium | Ex. 1 | Ex. 1 | Comp. Ex. 7 |
| Type of filler* | | | |
| silica foam | 20 | | 20 |
| Expanded graphite | | 20 | |
| Evaluation of dispersion stability (measurement of viscosity change) | | | |
| Initial viscosity (mPa · s) | 3200 | 3600 | 10500 |
| Viscosity after testing (mPa · s) | 3100 | 3500 | 8700 |
| Comprehensive evaluation | AA | AA | BB |

*Values indicate amounts (parts) of filler relative to 100 parts of thermal storage medium obtained in Example 1 or Comparative Example 7.

The types of the silica foam and the expanded graphite are described below.

silica foam: NS-K (manufactured by Tosoh Silica Corporation)
Expanded graphite: EC1500 (manufactured by Ito Kokuen Co., Ltd.)

The thermal storage media from Examples A1 and A2 did not show a marked decrease or increase in viscosity even when exposed to an environment at or above the temperature which caused a phase change of the paraffin compound contained in the medium. This result shows that the filler maintained the initial dispersion state and retained the function even at or above the phase change temperature.

Test Example B1

A packaging material was provided which was a laminate film including a 80 μm thick PE film as an innermost layer and a 15 μm thick PA film as an outermost layer. (The laminate film was such that the layers had been stacked one on top of the other by a dry lamination method, the resultant film had been folded in the middle, and the two sides in contact with the folded side had been heat sealed beforehand.) The thermal storage medium obtained in Example 1 was heated to 90° C. and was poured into the laminate film. The side of the laminate film that was parallel to the folded side was heat sealed, thereby packing the thermal storage medium tightly, namely without any airspaces, into the laminate film. The results of the evaluation of performance retention properties of the thermal storage medium are described in Table 6.

Test Examples B2 to B8

Film-packed thermal storage media were produced in the same manner as in Test Example B1, except that the type of the thermal storage medium and the layer configuration of the packaging material in Test Example B1 were changed as described in Table 6. The results of the evaluation of performance retention properties of the thermal storage media are described in Table 6.

[Performance retention properties]: The film-packed thermal storage medium was placed into a gear oven set at a temperature (the evaluation temperature described in Table 6) that was approximately 20° C. higher than the melting point of the paraffin compound contained in the thermal storage medium. After the thermal storage medium was allowed to stand in the oven for 10 days, the thermal storage medium was removed from the oven and the latent heat (kJ/kg) was measured with DSC in accordance with JIS K7122. Performance retention properties were evaluated to be "BB" when the latent heat had decreased at a decrease rate of 5% or more due to the volatilization of the paraffin compound, and were evaluated to be "AA" when the decrease rate was less than that.

TABLE 6

|  |  | Test Ex. B1 | Test Ex. B2 | Test Ex. B3 | Test Ex. B4 | Test Ex. B5 | Test Ex. B6 | Test Ex. B7 | Test Ex. B8 |
|---|---|---|---|---|---|---|---|---|---|
| Type of thermal storage medium | | Ex. 1 | EX. 5 | Ex. 8 | Ex. 1 | Ex. 1 | Ex. 1 | Ex. 1 | Ex. 1 |
| Configuration of packaging material (laminate film)* (thickness (μm)) | Innermost layer | PE (80) | PE (80) | PE (80) | PE (80) | PE (80) | PE (80) | PP (80) | PA (50) |
| | Outermost layer | PA (15) | PA (15) | PA (15) | PA (15) PET (15) | PA (15) EVOH (10) PET (15) | | | PET (15) |
| Evaluation (measurement of rate of decrease in latent heat) | | | | | | | | | |
| Evaluation temperature (° C.) | | 50 | 40 | 80 | 50 | 50 | 50 | 50 | 50 |
| Initial latent heat (kJ/kg) | | 186 | 195 | 131 | 186 | 186 | 186 | 186 | 186 |
| Latent heat after testing (kJ/kg) | | 183 | 194 | 128 | 184 | 186 | 130 | 142 | 160 |
| Comprehensive evaluation | | AA | AA | AA | AA | AA | BB | BB | BB |

*In the configuration of laminate films, an upper layer constitutes an inward side, and a lower layer constitutes an outward side. For example, the laminate film used in Test Example B4 had a configuration in which the innermost layer was PE, the intermediate layer was PA and the outermost layer was PET.

From the results of Test Examples B1 to B8, the thermal storage packages in which the thermal storage medium was packed in a laminate film having a heat seal layer (an innermost layer) and an oil resistant polar resin layer (Test Examples B1 to B5) showed a smaller rate of decrease in latent heat even when exposed to a high temperature for a long time, namely, these thermal storage packages retained the performance as thermal storage media at a higher rate as compared to the thermal storage packages in which the thermal storage medium was packed in a thermally fusible polyolefin film alone (Test Examples B6 and B7) and the thermal storage package in which the thermal storage medium was packed in a laminate film having no thermally fusible polyolefin film (Test Example B8).

INDUSTRIAL APPLICABILITY

The thermal storage medium composition according to the invention can suitably form a thermal storage medium which is free from phase separation or liquid phase bleeding and is excellent in terms of shape retention properties even at or above $T_{max}$ and further exhibits excellent fluidity when being shaped. Thus, the thermal storage medium composition is expected to be used in various fields including air-conditioning units in facilities such as hotels, airports and underground cities, automobile canisters, electronic parts such as IC chips, underwear fibers, thermally insulated containers for transportation of organs, curved mirrors and bridge concrete materials.

The invention claimed is:
1. A thermal storage medium composition which comprises
100 parts by mass of a hydrogenated diene copolymer and 50 to 4000 parts by mass of a linear paraffin compound having 12 to 50 carbon atoms,
the hydrogenated diene copolymer being a conjugated diene copolymer that is obtained by hydrogenating a block copolymer which includes a polymer block (A) that contains structural units (a-1) derived from a first conjugated diene compound and has a vinyl bond content of not more than 20 mol %, and a polymer block (B) that contains structural units (b-1) derived from a second conjugated diene compound and has a vinyl bond content of 30 to 95 mol %, the hydrogenation ratio with respect to the double bonds derived from the conjugated diene compounds being not less than 90%.
2. The thermal storage medium composition according to claim 1, wherein the mass ratio of the polymer block (A) to the polymer block (B) ((A)/(B)) in the block copolymer is 5/95 to 50/50.
3. The thermal storage medium composition according to claim 1 or 2, wherein the block copolymer further includes structural units derived from an alkenyl aromatic compound at a content of not more than 30% by mass with respect to the block copolymer.
4. The thermal storage medium composition according to claims 1 or 2, wherein the structural units (a-1) in the polymer block (A) include 95 to 100% by mass of 1,3-butadiene-derived structural units.
5. The thermal storage medium composition according to claims 1 or 2, wherein the paraffin compound shows a melting peak at 0 to 70° C. according to differential scanning calorimetry (DSC).
6. The thermal storage medium composition according to claims 1 or 2, further comprising a filler.
7. A thermal storage medium which is obtained by packing the thermal storage medium composition described in claims 1 or 2 into a packaging material.
8. The thermal storage medium according to claim 7, wherein the packaging material is a laminate film comprising a heat seal layer as an innermost layer and a layer made of a polar resin with oil resistance.
9. The thermal storage medium composition according to claim 1 or 2 wherein the linear paraffin compound has 16 to 50 carbon atoms.

* * * * *